J. M. CLARKE.
Smut Machine.
No. 3,499. Patented March 20, 1844.
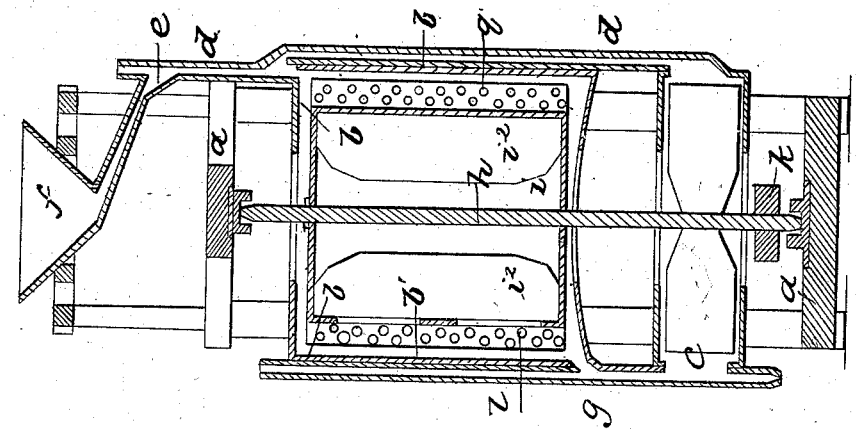
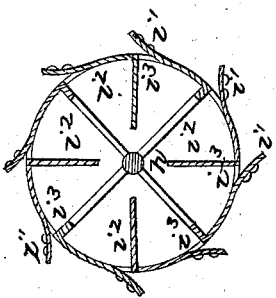
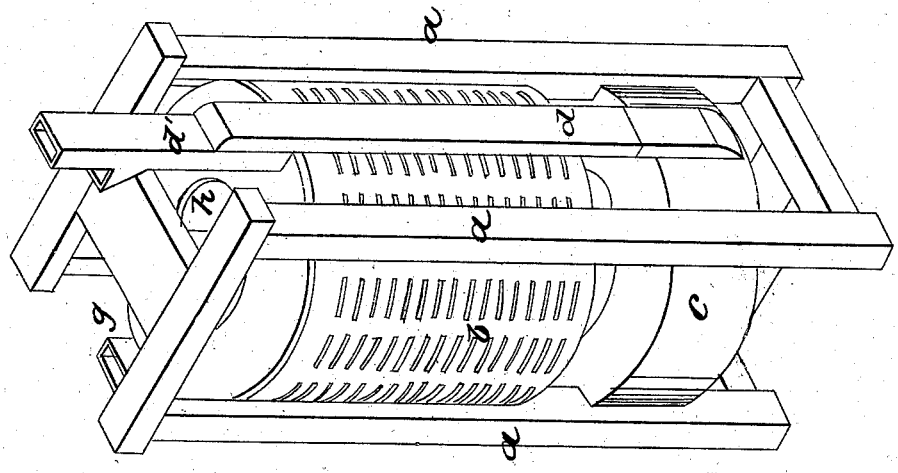

UNITED STATES PATENT OFFICE.

JAMES M. CLARKE, OF STRASBURG, PENNSYLVANIA.

SMUT-MACHINE.

Specification of Letters Patent No. 3,499, dated March 20, 1844.

*To all whom it may concern:*

Be it known that I, JAMES M. CLARKE, of Strasburg, in the county of Lancaster and State of Pennsylvania, have invented a new and useful Machine for Cleaning Grain from Smut, &c.; and I do hereby declare that the following is a full, clear, and exact description thereof, reference being had to the accompanying drawing, which forms a part of my specification, in which—

Figure 1, is an elevation of my machine and Fig. 2, the horizontal section through the cylinder. Fig. 3, is a vertical section through the spouts, concave, cylinder and fan.

The nature of my invention consists in the combination of spouts and fan for blowing the dirt from the grain and an additional fan inside the cylinder the blast from which acts on the grain through apertures in the cylinder which are shielded by the beaters attached to the outside of said cylinder between which and the concave the grain is scoured.

This construction of the machine is as follows: In a suitable frame ($a$) is placed a cylinder concave ($b$) having its surface pierced with rows of oblong horizontal slots with ribs ($b'$) projecting inward between the rows of slots; at its lower end there is a bottom, convex on its inner side, and having a large aperture at the center. Several inches below the concave above described there is a horizontal fan, the case of which is marked ($c$). This fan is of common construction with radial fans on the same shaft as the cylinder hereafter described; from the periphery of the fan case on one side a spout ($d$) leads up to the top of the concave where it turns into a straight vertical spout ($d'$) that conducts the grain into the concave at the top near the periphery; the grain is led into the spout ($d'$) by an inclined spout or shoe ($e$) from the hopper ($f$) through a hole in one side about half its height. On the opposite side of the fan case ($c$) is another vertical spout ($g$) which extends up nearly to the top of the concave; this spout receives the grain from the bottom of the concave and discharges it below the fan case as shown in Fig. 3. The shaft ($h$) of the cylinder extends down through the center of the concave and fan case where the fan is attached. The cylinder ($i$) is nearly the length of the concave and is hollow; it is connected with the shaft by arms; extending out from it; on the outside are vertical beaters ($i'$) which are placed at an angle between a tangent and radial line; under each of these is an aperture running the whole length, covered or shielded by the inclination of the beaters, as shown in the section Fig. 2; from the edge of these apertures vanes ($i^2$) project inward radially, by which, when the cylinder revolves, a blast of wind is forced through apertures ($i^3$) and falling grain, blowing out the cheat, smut, and fine dirt, through the concave. The cylinder can be reversed on the shaft, when the machine is to be run in a direction contrary to that it was first fitted for no other alteration is necessary of the parts of the machine. The faces of the beaters ($i'$) on the cylinder have projections on them to aid in scouring the grain as it passes through the machine. The cylinder is driven by a band from the motive power passing around a pulley ($k$) on the shaft the grain is fed into a spout ($c$) from a hopper ($f$) above the machine; from thence it is conducted down through a vertical spout ($d'$) into the concave, in falling through said vertical spout it meets a current of air from the fan below which blows out the smut balls, light dirt, &c., before scouring; on entering the concave the grain is scoured by the revolving cylinder the vanes on the inside thereof creating an outward blast through the falling grain which as soon as the dirt is removed from the grain, blows it out through the concave; the grain on reaching the bottom is swept out through an aperture on one side into a vertical spout ($g$) where it is again submitted to the action of a blast from the fan, after which it leaves the machine.

I do not claim in the above described machine making an outward blast by internal fans as that has been done but in a cylinder differing from mine but

What I claim as my invention, and desire to secure by Letters Patent is,

1. Constructing the cylinder in the manner described with vanes on its inside creating a blast outward through apertures made therein as above described and shielding said apertures by inclined beaters as before specified and reversing the same on the shaft.

2. I also claim the combination of the vertical spouts (*d, d', g*) with the fan (*c*) in the manner and for the purpose herein set forth and constructed and arranged substantially as described.

JAMES M. CLARKE.

Witnesses:
LAFAYETTE CALDWELL,
J. J. GREENOUGH.